Aug. 6, 1963  G. F. DALES  3,100,247
IMPROVEMENT IN THERMOSTAT CASING
Filed March 26, 1962

INVENTOR.
GEORGE FRANKLIN DALES
BY
ATTORNEY

3,100,247
IMPROVEMENT IN THERMOSTAT CASING
George Franklin Dales, 253 Castle Blvd., Akron, Ohio
Filed Mar. 26, 1962, Ser. No. 182,383
2 Claims. (Cl. 200—138)

This invention relates to an improved small thermostat with an elongated tubular casing. It includes the new thermostat and the method of making it.

Small thermostats with tubular casings about 1 to 2 or 3 inches long and with a cross-sectional area not measuring more than about ¼ to ⅜ inch in the largest dimension are known. They are made by inserting electrodes (including at least one bimetallic element) in one or both ends of the casing, with or without insulation, and then flattening the one or both ends of the casisg in place. If there is no electrode in one end of the casing it may be left open or it may be closed; in fact the thermostat may be made from a drawn casing which is closed at one end, by fastening one or two electrodes in the open end.

Instead of merely flattening the end of a casing onto an electrode, etc. as has been the previous practice, according to this invention the end or ends of the casing are tucked in as they are flattened. There are various advantages in this as will be explained in connection with the accompanying drawings in which the thermostat construction is clearly explained, and in which—

Figure 1:
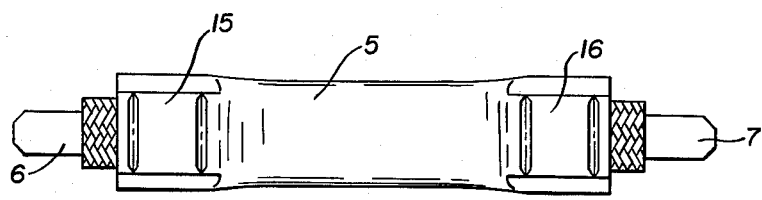
FIGURE 1 is a plan view of a thermostat, both sides of both ends having been tucked in as the ends were flattened.
Figure 2:
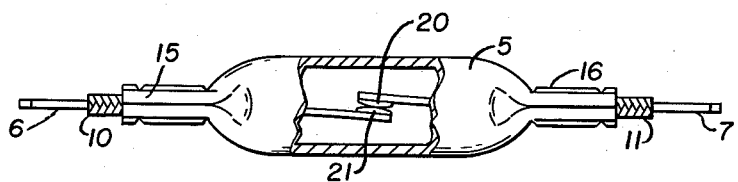
FIGURE 2 is a side view of the same with a portion of one side of the thermostat broken away to show its interior.
Figure 3:
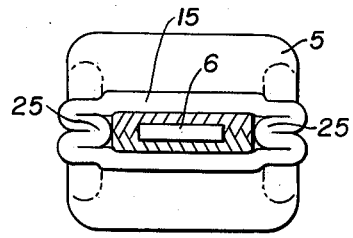
FIGURE 3 is an end view of the electrode showing that the casing is generally rectangular.

The casing 5 may be of steel or copper or other malleable conductive or non-conductive metal, or even deformable plastic. Copper is illustrated. The casing can have any cross-sectional shape. To insulate the electrodes 6 and 7 from the rectangular casing 5 sleeves 10 and 11 braided from stands of glass are shown. At least one of the electrodes is a bimetal. One sleeve may be omitted if the casing is live. Both electrodes may be held in one end of the casing instead of one in each end as shown. A contact button in the wall of the casing may be used in a thermostat in which a bimetal is the only electrode.

The ends 15, 16 of the casing are squeezed on to the electrodes. To calibrate the thermostat it is only necessary to flex either flattened end of the electrode to properly space the contact buttons 20, 21. To facilitate this, the ends (or only one end) of the casing may be staked.

If the ends of the casing are flattened with the edges extended, as has been the practice in the past, the edges of the insulation are apt to be sheared during the flattening operation. The ends flattened by the prior art procedure could be expanded by merely squeezing the edges of the thermostat manually. This is not possible with the improved casing. Furthermore, the insulation and electrodes would tend to slide laterally within the casings of the prior art, and this is not possible in the new structure.

In the thermostat of this invention, the edges 25 of the ends of the casing are tucked in as the ends are flattened. These bent-in or reversely folded edges 25 prevent lateral displacement of the electrode, and overcome the other mentioned disadvantages of the prior art structures.

Figure 4:
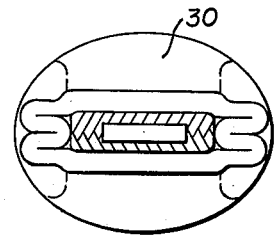
FIGURE 4 is the end view of a thermostat which is similar except that the casing is oval in cross section.

FIGURE 4 illustrates a similar thermostat except that the cross section of the casing 30 is oval. It may be any shape.

The invention is disclosed in the claims which follow.

What I claim is:

1. In a thermostat having an elongated casing of bendable material with an electrode protruding through one end of the casing, said end being staked laterally and the casing being flattened at that end, the improvement in which opposite edges of said flattened end of the casing are tucked in so that each end is reversely folded with the inner edge of the reverse fold alongside of and in contact with the contents of the casing whereby lateral displacement of the electrode within the casing is prevented and the tucked-in edges of the casing reduce the extent to which the lateral edges of the casing beyond the stake are flattened about the contents of the casing.

2. The thermostat of claim 1 in which the electrode is insulated and the reverse fold of the casing is in contact with the insulation.

References Cited in the file of this patent

UNITED STATES PATENTS

| | | |
|---|---|---|
| 2,904,619 | Forney | Sept. 15, 1959 |
| 2,994,945 | Cahill | Aug. 8, 1961 |
| 3,015,684 | Schneider | Jan. 2, 1962 |
| 3,061,699 | Epstein | Oct. 30, 1962 |